(12) United States Patent
Justo

(10) Patent No.: US 7,796,354 B2
(45) Date of Patent: Sep. 14, 2010

(54) METHOD AND APPARATUS FOR CONTROLLING DATA RATE OF A TAPE DRIVE

(75) Inventor: Roger J. Justo, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 339 days.

(21) Appl. No.: 11/873,207

(22) Filed: Oct. 16, 2007

(65) Prior Publication Data

US 2009/0097149 A1   Apr. 16, 2009

(51) Int. Cl.
*G11B 15/12* (2006.01)

(52) U.S. Cl. .............................. 360/61; 360/31; 360/60; 360/71

(58) Field of Classification Search .................. None
See application file for complete search history.

(56) References Cited

U.S. PATENT DOCUMENTS

| | | | | |
|---|---|---|---|---|
| 5,930,448 A | * | 7/1999 | Lee et al. | 386/78 |
| 6,038,094 A | * | 3/2000 | Matsumi et al. | 360/70 |
| 6,957,379 B1 | * | 10/2005 | Patapoutian et al. | 714/774 |
| 7,493,234 B2 | * | 2/2009 | Greco et al. | 702/182 |
| 2007/0097534 A1 | * | 5/2007 | Evans et al. | 360/31 |

* cited by examiner

*Primary Examiner*—Jason C Olson
(74) *Attorney, Agent, or Firm*—Dillon & Yudell LLP

(57) ABSTRACT

A method for controlling data rate of a tape drive is disclosed. The tape drive is connected to a computer system. The tape drive stores data by dividing the data into multiple codeword quads (CQs). A local memory within the tape drive includes drive to iteratively monitor data rate during write operations. If a number of CQ skips exceeds a pre-defined threshold value, the drive code reduces a maximum allowable data rate of the tape drive.

6 Claims, 2 Drawing Sheets

METHOD AND APPARATUS FOR CONTROLLING DATA RATE OF A TAPE DRIVE

BACKGROUND OF THE INVENTION

1. Technical Field

The present invention relates to storage devices in general, and in particular to tape drives. Still more particularly, the present invention relates to a method and apparatus for controlling data rate of a tape drive.

2. Description of Related Art

Computer systems typically operate at an exceeding high data rate. Thus, computer systems commonly require peripheral storage devices, such as tape drives, to also have relatively high throughput in order to keep pace. However, when a tape drive attempts to write data at a high rate, the number of write skips tends to also increase. A write skip is an error, such as a corrupted or missing codeword quad (CQ), that occurs during a write operation. Write skips can decrease the storage capacity and performance margins of a tape drive.

Consequently, it would be desirable to provide a method for controlling data rate of a tape drive to improve its performance.

SUMMARY OF THE INVENTION

In accordance with a preferred embodiment of the present invention, a tape drive is connected to a computer system. The tape drive stores data by dividing the data into multiple codeword quads (CQs). A local memory within the tape drive includes drive to iteratively monitor data rate during write operations. If a number of CQ skips exceeds a pre-defined threshold value, the drive code reduces a maximum allowable data rate of the tape drive.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
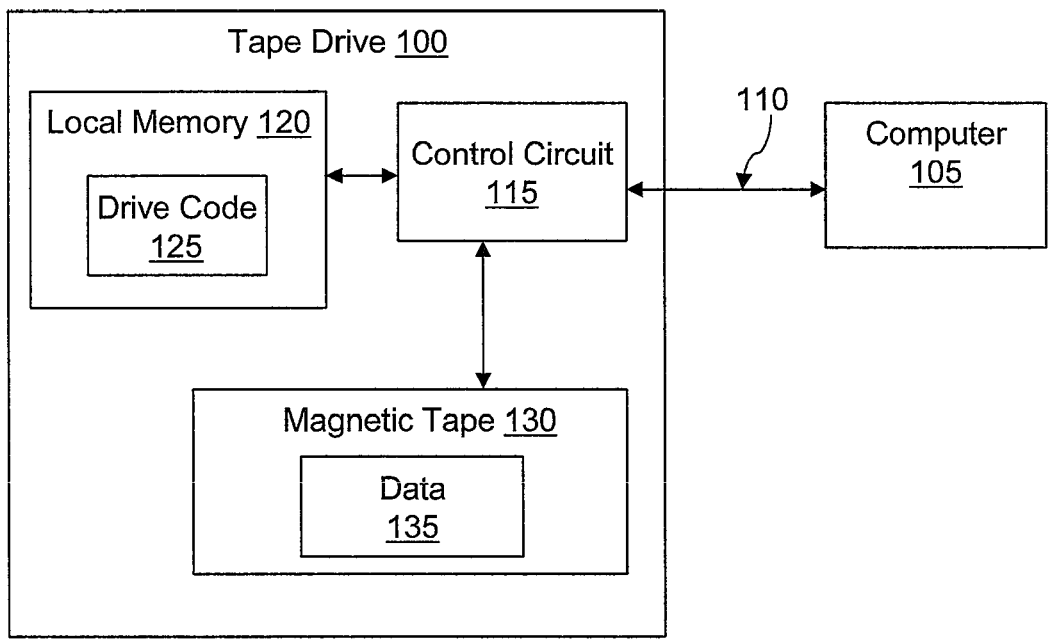
FIG. 1 is a block diagram of a tape drive in which a preferred embodiment of the present invention is incorporated.

With reference now to the drawings, and in particular to FIG. 1, there is depicted a block diagram of a tape drive in which a preferred embodiment of the present invention is incorporated. As shown, a tape drive 100 is coupled to a computer 105 via a data cable 110. Tape drive 100 includes a control circuit 115, a local memory 120 and a magnetic tape 130. Tape drive 100 is capable of reading data from and writing data to magnetic tape 130. Control circuit 115 controls the speed of read and write operations of tape drive 100 according to drive code 125 stored within local memory 120. Tape drive 100 may receive electrical power from computer 105 via data cable 110 or from an external power source (not shown) connected directly to tape drive 100.

Any data stored in magnetic tape 130, such as data 135, are divided into multiple datasets referred to as codeword quads (CQs). Drive code 125 enables control circuit 115 to minimize write skips by controlling a maximum allowable rate at which data may be written to magnetic tape 130. As utilized herein, a write skip refers to an error, such as a corrupted or missing CQ, that occurs during a write operation. Similarly, a write operation refers to an operation in which control circuit 115 receives datasets from computer 105, and during which control circuit 115 format those datasets with a new type of datasets having CQs on magnetic tape 130.

Figure 2:
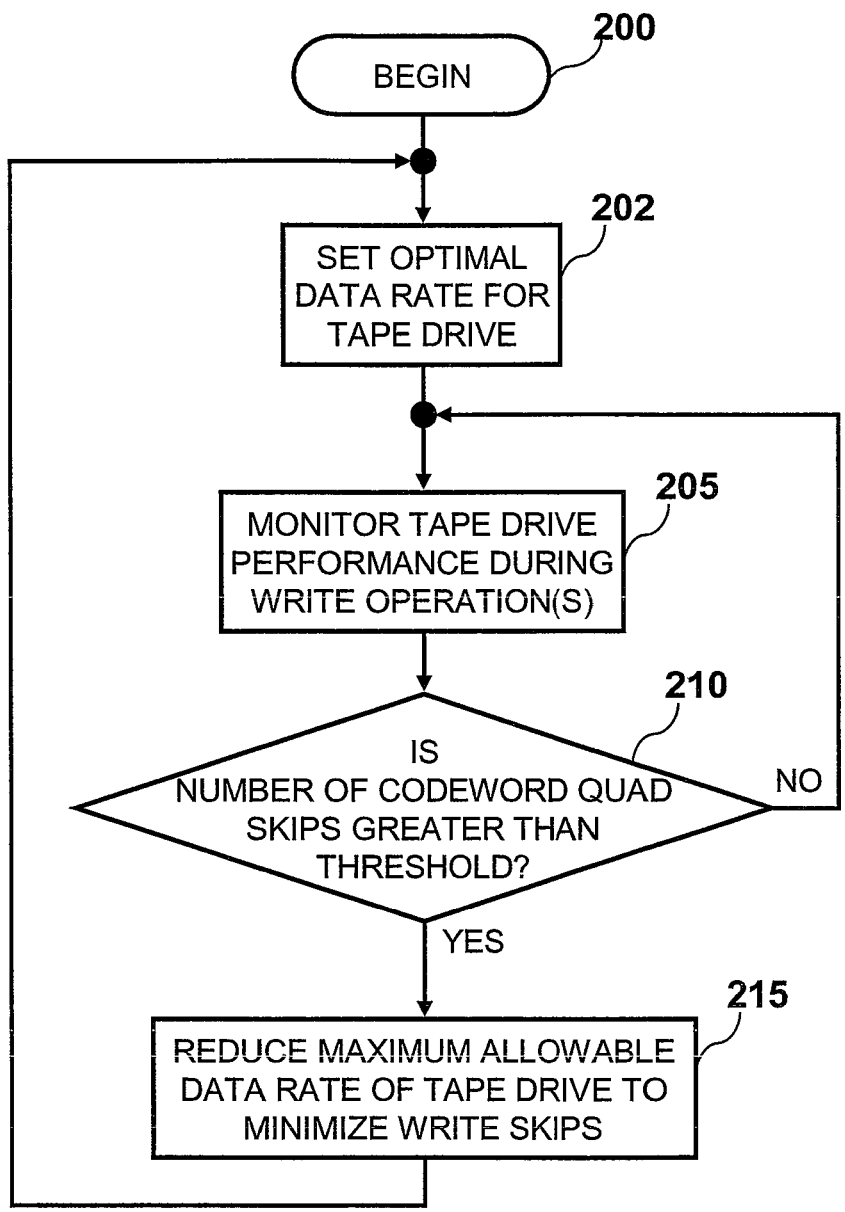
FIG. 2 is a high-level logical flow diagram of a method for controlling data rate of a tape drive, in accordance with a preferred embodiment of the present invention.

Referring now to FIG. 2, there is illustrated a high-level logic flow diagram of a method for controlling data rate of a tape drive, such as tape drive 100 from FIG. 1, in accordance with a preferred embodiment of the present invention. Starting at block 200, an optimal data rate is set for the tape drive, as shown in block 202. The performance of the tape drive is monitored during a write operation, as depicted in block 205. A determination is made whether or not a number of CQ skips (i.e., write skips) is greater than a predetermined threshold value, as shown in block 210. If the number of CQ skips is not greater than the predetermined threshold value, the process returns to block 205 to continue monitoring the performance of the tape drive. The predetermined threshold value is preferably defined by a user.

Otherwise, if the number of CQ skips is greater than the predetermined threshold value, a maximum allowable data rate of the tape drive is reduced in order to minimize write skips, as depicted in block 215. After the completion of the write operation, the process returns to block 202 to reset the data rate to an optimal data rate.

As has been described, the present invention provides a method for improving tape drive performance and storage capacity by controlling data rate of a tape drive based on write skips.

While an illustrative embodiment of the present invention has been described in the context of a fully functional tape drive, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for controlling data rate of a tape drive, said method comprising:

setting a data rate of a tape drive to an optimal data rate;

monitoring performance of said tape drive during a write operation of said tape drive; and in response to the number of occurrences of codeword quad (CQ) skips exceed a predetermined threshold value during said write operation, reducing said data rate of said tape drive to a maximum allowable data rate.

2. The method of claim 1, wherein said predetermined threshold value is defined by a user.

3. The method of claim 1, wherein said method further includes resetting said data rate of said tape drive to said optimal data rate after said write operation.

4. A computer storage medium having a computer program product for controlling data rate of a tape drive, said computer storage medium comprising:

computer program code for setting a data rate of a tape drive to an optimal data rate;

computer program code for monitoring performance of said tape drive during a write operation of said tape drive; and computer program code for, in response to the number of occurrences of codeword quad (CQ) skips exceed a predetermined threshold value during said write operation, reducing said data rate of said tape drive to a maximum allowable data rate.

5. The computer storage medium of claim 4, wherein said predetermined threshold value is defined by a user.

6. The computer storage medium of claim 4, wherein said computer storage medium further includes computer program code for resetting said data rate of said tape drive to said optimal data rate after said write operation.

* * * * *